United States Patent [19]

Ritter et al.

[11] Patent Number: 6,085,099
[45] Date of Patent: Jul. 4, 2000

[54] MESSAGE TRANSMISSION SYSTEM

[75] Inventors: Rudolf Ritter, Zollikofen, Switzerland; Joachim Hertel, Dietzenbach, Germany

[73] Assignee: Generaldirektion PTT, Berne, Switzerland

[21] Appl. No.: 08/916,793

[22] Filed: Aug. 25, 1997

Related U.S. Application Data

[63] Continuation of application No. 08/492,510, Jun. 20, 1995, abandoned.

[30] Foreign Application Priority Data

Jun. 20, 1994 [EP] European Pat. Off. .............. 94810363

[51] Int. Cl.$^7$ ...................................................... H04Q 7/22
[52] U.S. Cl. ........................... 455/466; 455/558; 379/357
[58] Field of Search ............................. 235/380; 379/356, 379/357; 340/311.1, 825.44; 455/422, 426, 550, 560, 466, 445, 557

[56] References Cited

U.S. PATENT DOCUMENTS

| 5,224,150 | 6/1993 | Neustein ..................................... 379/57 |
| 5,351,235 | 9/1994 | Lahtinen ............................. 455/53.1 X |
| 5,390,252 | 2/1995 | Suzuki et al. ............................... 379/62 |
| 5,546,444 | 8/1996 | Roach, Jr. et al. ........................ 379/59 |
| 5,557,655 | 9/1996 | Lantto ........................................ 379/58 |
| 5,594,740 | 1/1997 | LaDue ................................. 455/466 X |
| 5,724,664 | 3/1998 | Lantto ..................................... 455/560 |

FOREIGN PATENT DOCUMENTS

| 0 555 992 | 2/1993 | European Pat. Off. . |
| 0 562 890 | 3/1993 | European Pat. Off. . |
| 683 052 | 12/1993 | Switzerland . |
| 92/14329 | 8/1992 | WIPO . |
| 92/14330 | 8/1992 | WIPO . |
| WO 93/26131 | 12/1993 | WIPO . |

OTHER PUBLICATIONS

Telecommunication Journal of Australia, vol. 43, No. 2, 1993, pp. 33–38.

*Primary Examiner*—William G. Trost
*Attorney, Agent, or Firm*—Jacobson, Price, Holman & Stern, PLLC

[57] ABSTRACT

The system for transmitting messages is used in a mobile radio telephone network (1) having a number of terminals (4, 9). The terminals may be either permanently allocated to a specific user or allocated to a specific user by means of a chip card insertable in the terminal. At least two terminals can enter into voice or data communication with one another in the mobile radio telephone network. The mobile radio telephone network comprises at least one center (8) for controlling the message transmission, each message being a data communication in which data telegrams containing a standardized data header are exchanged. For processing special services according to a special procedure accessible only to a certain authorized subscribers, the data telegram comprises an identification code in addition to the standardized data header. A central unit (10) associated with the center and at least some of the terminals have units for generating data telegrams provided with the identification code. The central unit for the special services, as well as authorized terminals or authorized chip cards, are equipped with a filter (12.1, 12.2), preferably a software filter, for recognizing the identification code. The possibility is thus offered not only of transmitting any desired bit streams in transparent mode according to GSM Phase 2, but also of sending data and executable instructions to or receiving them from authorized subscribers without having to change internationally established standards.

29 Claims, 6 Drawing Sheets

MESSAGE TRANSMISSION SYSTEM

This is a continuation of application Ser. No. 08/492,510, filed Jun. 20, 1995 which was abandoned upon the filing hereof.

BACKGROUND OF THE INVENTION

The present invention relates to a device for transmitting messages in a communication network for voice and data processing of the type having a plurality of terminals which are each allocated to a specific user or can be allocated to a specific user by means of a data carrier insertable in the terminal, at least two terminals being capable of entering into voice or data communication with one another, and having at least one center for controlling the message transmission within the communication network, each message transmission being a data communication wherein data telegrams containing a standardized data header are exchanged.

Many countries currently offer national mobile radio telephone networks using a multitude of technical standards. For international traffic, however, the differing networks constitute an obstacle. A mobile telephone subscriber expects to be able to use his terminal apparatus in various locations in a number of countries, e.g., all over Europe.

With the introduction of the GSM (Global System for Mobile Communication) standard, i.e., the standard for a cellular radio telephone network, the way has become free for a uniform network and thus for international traffic.

Figure 1:
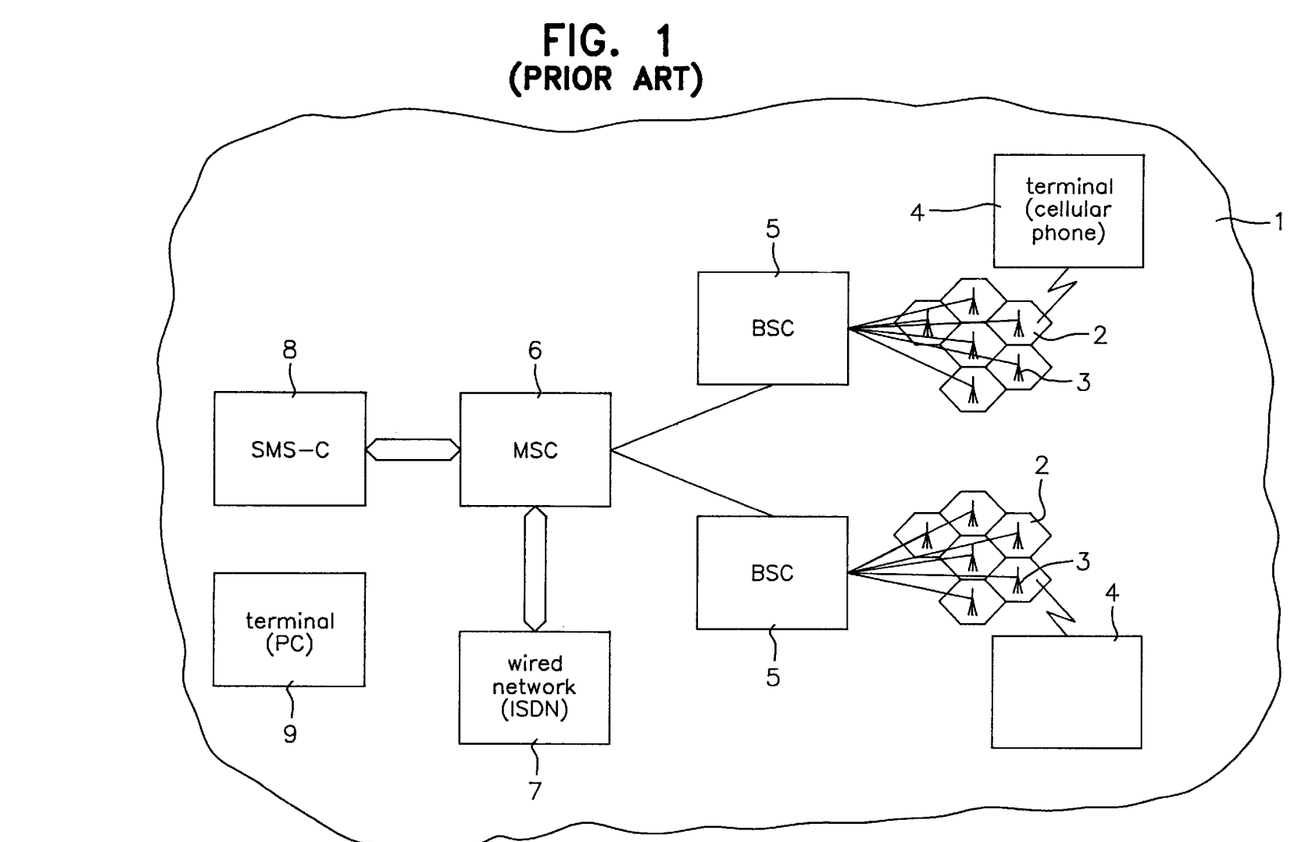
FIG. 1 is a diagram of the basic structure of a prior art mobile radio telephone network operating according to the GSM standard.

FIG. 1 of the accompanying drawings shows the basic structure of a mobile radio telephone network operating according to the GSM standard. Reference numeral 1 therein designates the surface area of the network. This entire area is covered by radio cells 2 adjoining and overlapping one another, only a few such cells being visible in FIG. 1. In each cell 2 there is a base station 3 (Radio Base Station or RBS) which takes care of radio communication to the terminals of the mobile telephone subscribers. Along each radio route between a base station 3 and a terminal 4, all voice and control information, as well as other data such as messages, is transmitted in digitally coded form.

Reference numeral 5 designates a controller (Base Station Controller or BSC) by means of which several base stations are controlled. For example, the controller is responsible for the smooth radio-technical transition of a subscriber, or rather of the terminal allocated to a subscriber, particularly a mobile radio telephone, from one radio cell to an adjacent one. On the basis of automatically performed field strength measurements, the controller decides when the transition should be initiated from one radio cell to which adjacent radio cell. Such a transition is called a handover or handoff.

The controllers are in turn grouped into a higher-ranking mobile radio center 6 (Mobile Service Switching Center or MSC) which establishes the transition to a wired network 7, e.g., an ISDN (Integrated Services Digital Network). In such a telecommunication network, voice information, image information, and information from data-processing equipment, for example, can be transmitted simultaneously.

Reference numeral 9 indicates another terminal, e.g., a personal computer (PC) by means of which, among other things as a data-communication application, messages can be transmitted to a mobile radio telephone 4. The possibility of doing this is known in the art as an SMS (Short Message Service). However, messages may also be transmitted from one mobile radio telephone to another. The connection is then always handled via a so-called Short Message Service Center (SMS-C) 8. The SMS is a telecommunication service which permits messages to be sent from the Short Message Service Center to a GSM subscriber (SMS Mobile Terminated/Point-to-Point or MT/PP) or from a GSM subscriber to the Short Message Service Center (SMS Mobile Originated/Point-to-Point or MO/PP). Each message is then packed in a data telegram preceded by a standardized data header, containing among other things the identification of the subscriber and a code indicating that this is a message.

This procedure, defined in GSM Standard 3.40, is called GSM Phase 2. It allows the transmission of any desired bit streams in a transparent mode. Short messages such as "Please call subscriber XYZ," for instance, can thereby be transmitted from a subscriber A via the Short Message Service Center to a subscriber B. The message is indicated to the recipient in a display, for example.

From GSM Phase 2 there are also so-called Class 2 messages. In mobile radio telephones or other terminals provided for the processing of Class 2 messages, the existence of a storage means is presupposed, preferably a Subscriber Identification Module (SIM) in the form of a chip card. Contained in the storage means are, among other things, all necessary data for identifying the user. Chip cards or processor chip cards can be inserted in any desired terminal to be used. One advantage of such a design is that a mobile radio telephone subscriber, for instance, need not take his own terminal with him but only his chip card.

Class 2 messages or further developments based thereon, which may consist of one or more messages, are filed message-wise in the aforementioned storage means. As soon as this is done, an affirmative acknowledgment is sent to the Short Message Service Center.

The possibility is thereby offered of sending to or receiving from a storage means in a terminal both data and executable instructions.

SUMMARY OF THE INVENTION

It is therefore an object of this invention to provide an improved message transmission system which further extends the advantageous properties of Class 2 messages.

Another object of this invention is to provide a system making it possible not only to transmit transparent bit streams but also to offer special services to authorized subscribers via SMS.

To this end, in the system for transmitting messages in a communication network for voice and data processing according to the present invention, of the type initially mentioned, data telegrams may contain an identification code in addition to the standardized data header; at least one central unit existing in the communication network and at least some of the terminals have means for generating data telegrams provided with the identification code, the data telegrams being transmitted either from the central unit to at least one of the terminals or from one of the terminals to the central unit; there are filters for recognizing the identification code, one of the filters being respectively associated with the central unit and with at least each of the aforementioned some of the terminals, and the identification code being provided for informing the central unit or the terminal that the data contained in the message are to be processed according to a special, not otherwise accessible procedure.

Thus, by means of the inventive identification code which may be present in a data telegram of a message in addition to the standardized data header, it is indicated that the data in this message are data to be processed according to a special procedure. The identification code, preferably coming after the standardized data header, is generated either by a central unit or by terminals equipped for that purpose and is transmitted together with the data telegram to the remote station, either the terminal or the central unit. Both the central unit and terminals equipped for that purpose check upon reception of each data telegram, recognizable by the standardized data header, whether the message additionally contains an identification code. If it does not, the data of the data telegram are treated as a normal, hitherto customary message according to the SMS standard. If it does, the central unit knows that the sender of the telegram is sending information to be assigned to a special service not otherwise accessible or to a special application. The terminal also knows in this case that the data in the telegram having a recognized identification code comprise data for dealing with and/or displaying information of a certain special service dialed beforehand. Data telegrams provided with the identification code make it possible to transmit data and executable instructions to terminals specially equipped with a filter for recognizing such data telegrams and to receive them from such terminals in the central unit that likewise comprises an analogous filter. Starting from that, an application protocol can be defined between the terminals thus equipped and the central unit, which is a controlling center, a so-called service center; this protocol regulates for the selected terminal the message synchronization, data authenticity by means of cryptogram, and generating of an executable instruction. On the basis of the application protocol, new services offered by the network provider to the respective subscriber may be defined, which services may be understood as a message exchange between a terminal provided with an appropriate filter and the service center. As an example of such a special service, it is possible, for instance, to carry out location-dependent inquiries. Thus it can be made possible, among other things, to ask for location-dependent telephone numbers of emergency services such as breakdown services, doctors, pharmacies, etc.

The identification code can be defined by the network provider. It need not be coordinated with any international standards, and it may comprise security facilities developed in any desired way, so that a chance call for special services by unauthorized subscribers may be excluded. The filter expediently takes the form of a software module. This software module must be stored when the initial data are defined in a terminal permanently allocated to a subscriber, or on a data carrier, preferably a chip card, permanently allocated to a subscriber and insertable in a plurality of non-allocated terminals.

Since the mentioned communication network in which the system is used is preferably a digitally operating communication network, but particularly a cellular mobile radio telephone network defined according to the GSM standard or the DCS 1800 standard, mobile radio telephones are predominantly foreseen as terminals. Such telephones are increasingly equipped in such a way that they contain a read-write device for a chip card, especially for processor chip cards (SIM). However, a terminal might also be a data-processing apparatus such as a personal computer or a hand-held computer, for example. It would further be conceivable that such apparatus might in future also have a data read-write device for chip cards, though that is not yet customary at present. User-specific computer data are, after all, insertable in various data-processing equipment right now by means of mobile data-carriers such as floppy disks, hard disks, or chip-card-sized PCMCIA-standard storage means.

Flowcharted, the mentioned filter represents a branching facility which forwards messages not containing the identification code to a first output and supplies messages in which the identification code is recognized to a second output. This filter, preferably a software component on the chip card, is always addressed when the terminal, especially the mobile radio telephone, addresses the chip card with the update SMS command, i.e., when a message or short message is supposed to be stored on the chip card. Messages supplied to the second output on the basis of the correct identification code are then checked as to correct message synchronization. If this is not present, the message is not accepted. If the message synchronization is correct, the message is checked as to whether it is a partial message or a complete single message.

The filter may be any facility suitable for recognizing and/or eliminating data telegrams containing the identification code.

According to the present invention, it is proposed that the number of partial messages for a full message and information for the location of the respective partial message within the message be contained in the identification code. In the storage means of the chip card, the individual messages are stored in the order of their arrival at least until the full message has been received. Only then does processing begin in the correct order of the individual messages, which need not be the order of reception. In the center, it is provided that the central unit for the special services comprise an operating center, a so-called SIM Service Center (SSC). For each special service, a logic module (Service Logic or SVL) may be associated with this SIM Service Center. The individual logic modules are functionally connected to the SIM Service Center. Further associated with the SIM Service Center is a database intended, among other things, for managing the credentials of the subscribers authorized to transmit messages with an identification code. An authenticity checking unit (Authentification Center or AUC) is also functionally connected to the SIM Service Center. This is a module for calculating, encoding, and checking a security code contained in the identification code, the cryptogram.

The way in which the security code is formed will be discussed below. It may merely be stated here that a random number is included, the random number itself preferably being a function of the message definable by the provider of the communication network.

BRIEF DESCRIPTION OF THE DRAWINGS

A preferred embodiment of the invention will now be described in detail with reference to the accompanying drawings, in which.

DESCRIPTION OF THE PREFERRED EMBODIMENTS

Figure 2:
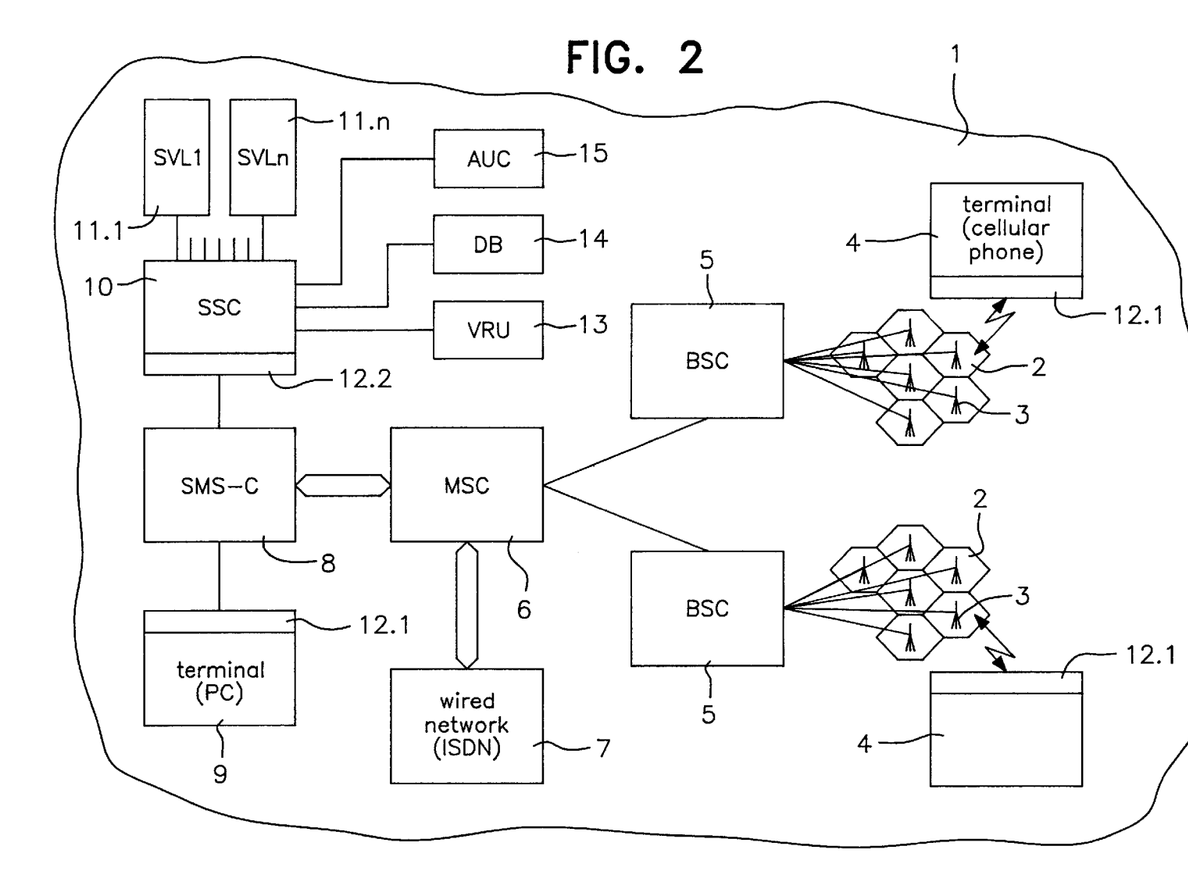
FIG. 2 is a diagram of a mobile radio telephone network operating according to the GSM standard, expanded according to the invention.

Starting from a cellular mobile radio telephone network according to FIG. 1, preferably operating digitally, defined according to the GSM standard or the DCS 1800 standard, the inventive system for the transmission of messages comprises the network extensions indicated in FIG. 2.

For sending and receiving messages containing the inventive identification code in their data telegram, terminals 4 and 9 are provided with a filter 12.1. This filter is preferably a software module contained either in a memory in the terminal itself or preferably on a chip card to be inserted in a read-write device disposed on terminal 4.

Short Message Service Center (SMS-C) 8 relays data telegrams transmitted from terminals 4 and 9 to an operating center for special services (SIM Service Center or SSC) 10. A filter 12.2, similarly associated with operating center 10, returns data telegrams lacking an identification code directly to SMS-C 8 and further processes only messages having an identification code. A logic module (SVL 1, SVL n, Service Logic) 11.1 to 11.n is preferably associated with operating center 10 for each special service, an example of which has already been briefly mentioned earlier. The logic module for a first special service or a first application is designated as 11.1, and a logic module for an nth special service or application is designated as 11.n. The number of special services or applications is not limited and is essentially dependent upon the creativity of the network provider.

SSC 10 co-operates with modules 14 and 15 for managing credentials of individual subscribers who are authorized to transmit messages having an identification code, as well as for calculating, encoding, and checking a security code contained in the identification code. The first of these modules is substantially a database 14 in which subscriber identification data of subscribers authorized to use the special services are filed. In the second module, Authentification Center 15, particularly a security code contained in the identification code is checked in received messages and is calculated and encoded for messages to be transmitted. An example of this is to be found below.

A unit for a spoken response (Voice Respond Unit or VRU) 13 is preferably also associated with SSC 10 especially for giving support in accessing a desired special service by means of verbal communications to a subscriber calling for that special service. In particular cases, VRU 13 may also be a help desk where the spoken text is delivered personally.

Figure 3:
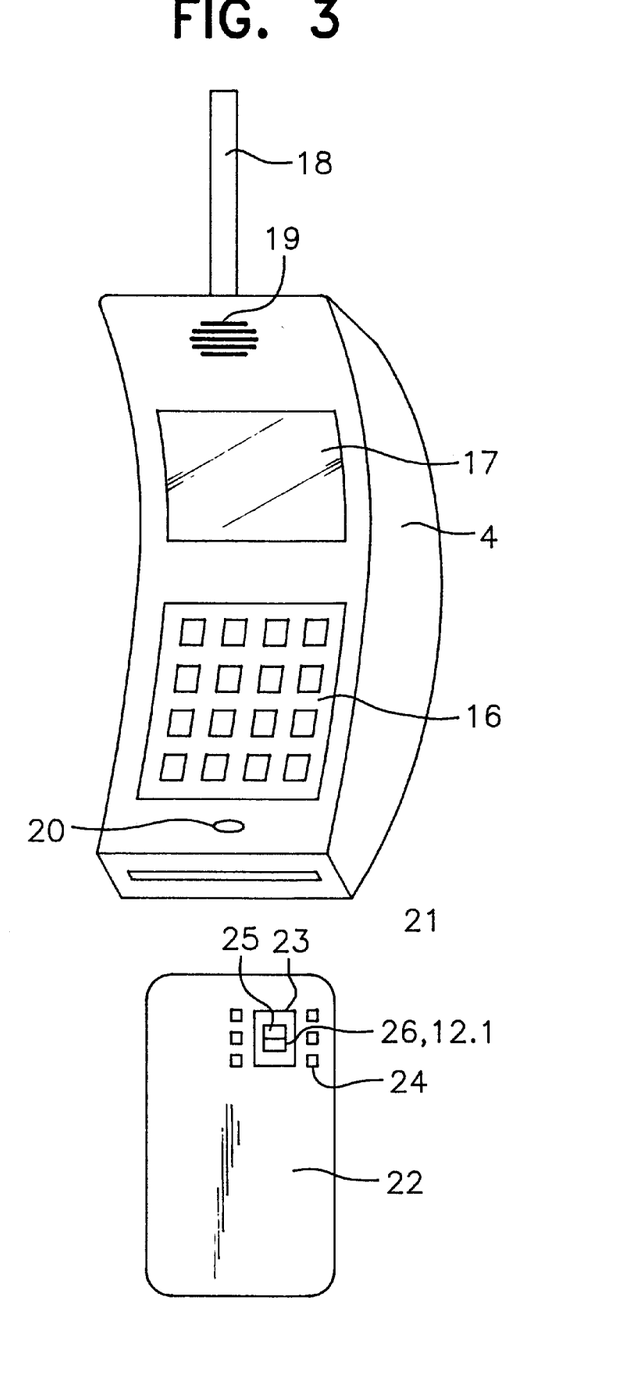
FIG. 3 is a diagrammatic perspective view of a mobile radio telephone with a chip card for a mobile radio telephone network according to FIGS. 1 and 2.

A mobile radio telephone 4 such as is customarily used with an inventive message transmission system according to the described embodiment is shown in FIG. 3. The mobile radio telephone comprises a control panel or key pad 16, a display, especially in the form of an LCD 17, an antenna 18, a receiver opening 19 behind which a receiver is disposed for delivering voice communications, and a microphone opening 20 through which acoustic signals to be transmitted are supplied to a microphone. Telephone 4 is further provided with an opening 21 for insertion of a chip card. In opening or slot 21 there is a read-write device by means of which an exchange of data can take place between the terminal and a chip card 22. For operating with the special services, chip card 22 needs at least one 8kB EEPROM which is contained on a chip 23 and is not shown in detail in the drawing. Chip 23 can be electrically connected to the read-write device disposed in telephone 4 via a contact bank assembly 24 composed of a plurality of individual electrical contacts. Reference numeral 25 on chip 23 designates a memory area comprising a Card Operating System (COS). Reference numeral 26 indicates the memory area in which the inventive filter 12.1 is filed. There are also further memory areas, not specially visible in the drawings, particularly for temporarily storing several partial messages of a full message.

Figure 4:
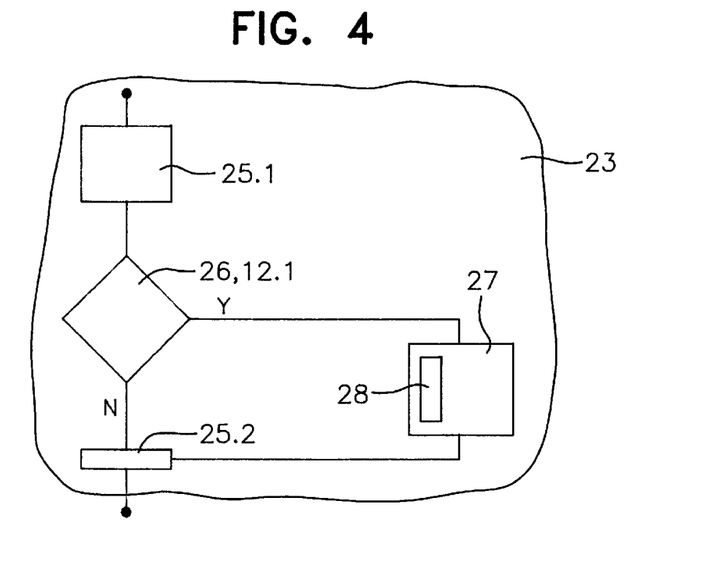
FIG. 4 is a first flowchart illustrating the function of the inventive filter.
Figure 5:
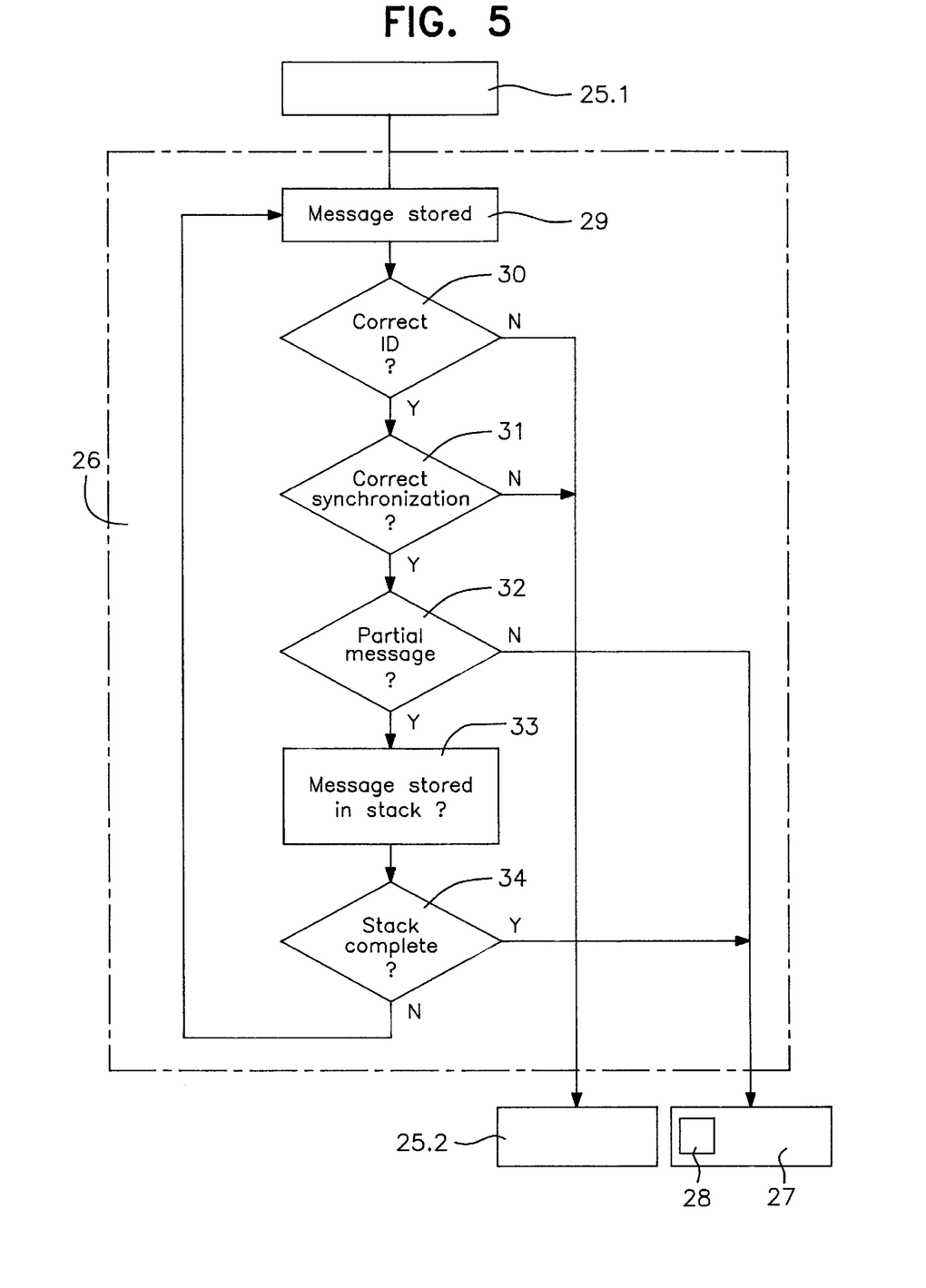
FIG. 5 is a second flowchart from which the main mode of operation of the filter is apparent.

How the inventive filter 12.1 for recognizing the identification code is functionally designed and can be inserted in the operating system on chip 23 of a chip card follows from FIGS. 4 and 5. Here COS 25 is divided into a first part 25.1 which especially recognizes from an information flow reaching the terminal whether there is a data telegram therein having the standardized data header defined according to GSM 4.08 or GSM 3.40. If such a short message is recognized, the first part 25.1 of COS 25 ensures that the respective data telegram is intercepted. By means of the inventive filter 12.1, each recognized data telegram is now scanned for the presence of the identification code. As already stated, filter 12.1 represents a software branching circuit having an input and two outputs, data telegrams which do not contain the identification code being supplied directly to a first output connected to block 25.2, a second part of COS 25. In the prior art, such a data telegram is now stored on the chip card. This is usually done based upon instructions which may, for example, be contained in second part 25.2 of the COS. If filter 12.1 recognizes an identification code, the respective message is supplied via a second output to a module 27 for processing a special service. Contained in the identification code, among other things, is information stating whether the message received is a single message or whether further messages follow until a full message is transmitted. In any case, the terminal is informed which part of the full message has just been received. This is necessary since the partial messages are transmitted within the communication network according to certain priority criteria—which need not be discussed here—responsible for the fact that a number of partial messages may arrive at the receiving apparatus in some order which need not necessarily correspond to the correct order. So that no difficulty may arise thereby, a memory area or stack 28 is provided on the chip where all parts of a message are stored until the whole message has been transmitted. Only then does processing of the message begin. If a message consists of only one part, processing naturally takes place immediately.

FIG. 5 shows another flowchart illustrating the basic mode of operation of the inventive filter. As soon as a data telegram according to the GSM standard has been detected as a message (block 29), it is checked in a first interrogation block 30 whether the data telegram contains a correct identification code. If not, the message is relayed at the first output of the filter to block 25.2. In the case of correct recognition, which is carried out through recalculation of the earlier-mentioned cryptogram and comparison with the transmitted cryptogram, it is further checked in a second interrogation block 31 whether the synchronization is correct. Both the synchronization and the cryptogram will be discussed in more detail below. If the synchronization is incorrect, the data telegram is turned over directly to block 25.2. If the synchronization is correct, it is determined in a third interrogation block 32 whether the message just received is a full message or merely a partial message. How this is determined will likewise be described below. If the message is a complete one, it is supplied directly to module 27 for immediate processing. If, on the other hand, it is determined that a message is only partial, processing cannot take place for the aforementioned reasons until the whole message is available. In this case, the partial message is stored in the stack 28 provided for that purpose at least until all partial messages are available and processing can begin. This is monitored in decision block 34.

Filter 12.2, preferably also a software module filed in a memory area of the SSC, corresponds functionally to the filter just described.

Figure 6:
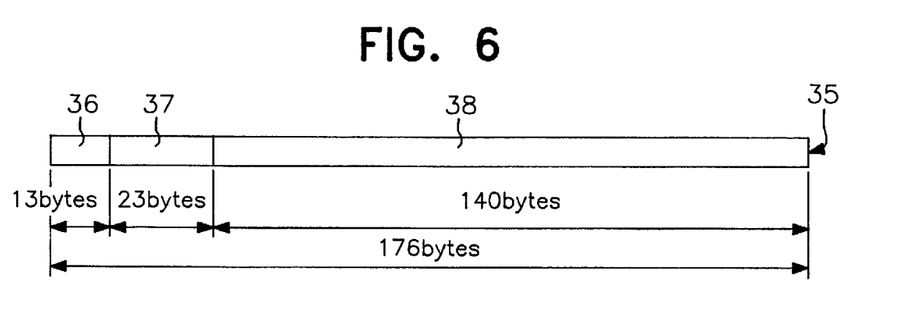
FIG. 6 is a diagram showing the structure of a data telegram of an SMS message according to the GSM standard.

A data telegram 35 for transmitting a short message by the standardized SMS is shown in FIG. 6. This data telegram is defined according to the GSM standard with a length of 176 bytes. It comprises a data header 36, 37 comprising a first block 36, 13 bytes long, containing subscriber address data defined, as already stated, according to GSM Standard 4.08. Following the mentioned first block 36 there is a second block 37 having a length of 23 bytes and containing SMS-specific data defined according to GSM Standard 3.40. The individual blocks need not be further described in this context since the respective information may be found in the mentioned publications.

Following the data header, there are 140 bytes in a standard data telegram, containing essentially message information 38 and (FIG. 7) 40, 44.

Figure 7:
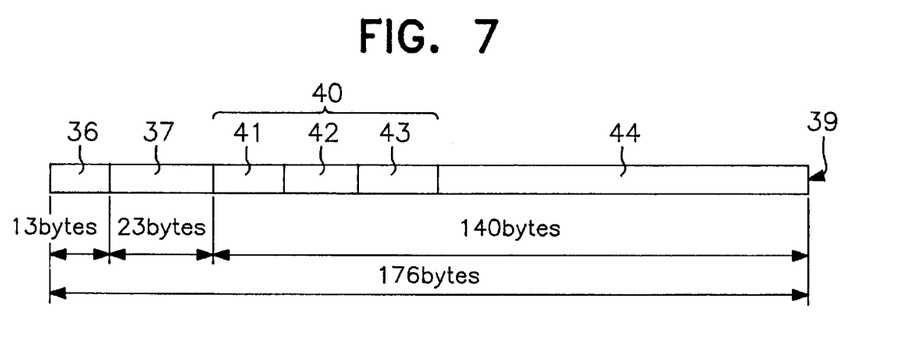
FIG. 7 is a diagram showing the structure of a data telegram of a message having an identification code for special services.

Unlike the data telegram just described, data telegram 39 in FIG. 7 comprises the inventive identification code 40, called the Transport Protocol Data Unit (TP-DU). In accordance with the GSM standard, data telegram 39 is likewise 176 bytes long and includes the same data header consisting of blocks 36, 37. Preferably adjacent thereto is identification code 40 which is in turn composed of a plurality of blocks 41, 42, 43. These blocks, necessary for an error-free information flow for messages associated with special services, comprise a first block 41 with indications concerning the number of partial messages for a complete message, indications concerning the position of the partial message in the complete message, and indications concerning the total number of messages transmitted starting from a time t0. Block 42 comprises data relative to the synchronization of the messages, to be discussed in detail below. The same applies to block 43, in which there is filed a security code calculated from the data of block 42 and from secret data stored both at the transmitting end and the receiving end. In the mobile radio telephone the secret data are contained in the chip card, and in the SIM Service Center they are contained in the associated database. Further details in this regard will also be given below in an explanation of the message transmission process.

Figure 8:
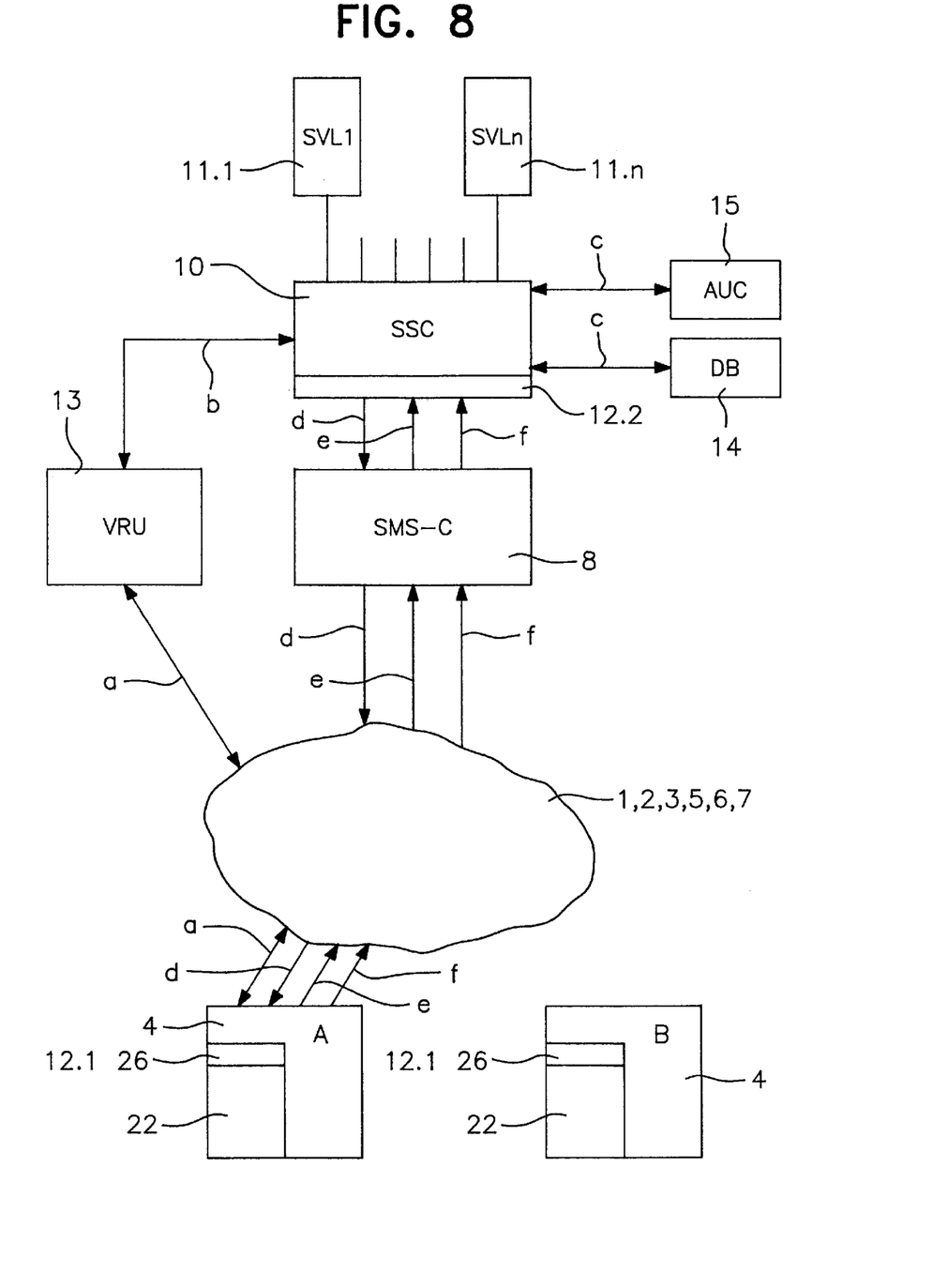
FIG. 8 is a diagram of the mobile radio telephone network of FIG. 2 presented differently for explaining the process of a message transmission.

Such a process for message transmission may be seen in FIG. 8. There the mobile radio telephone network of FIG. 2 is illustrated in a way which lends itself better to an explanation of this process. In the chosen illustration, radio cells 2, base stations 3, the controller 5 for a plurality of base stations, the mobile radio center 6, and a wired telephone network 7 connected thereto are combined in a single area. Outside that area are two terminals, particularly mobile radio telephones 4, each provided with a chip card 22 and allocated to a subscriber A and a subscriber B, respectively. Also outside the common area is the Short Message Service Center (SMS-C) 8. Functionally connected to SMS-C 8, according to the present invention, is the operating center for the special services (SIM Service Center or SSC) 10 having the filter 12.2. Associated with the operating center, as already stated, are Service Logic Modules 11.1 to 11.n, each for a special service. Further shown in FIG. 8 outside the common area are the two modules 14 and 15, i.e., database module 14 and authenticity checking unit 15. Voice Respond Unit (VRU) 13 is included as well.

Subscriber A, who has inserted his personal chip card 22 in a mobile radio telephone 4 and is marked and identified thereby, calls a service number using the keys on his control panel. This may be a toll-free telephone number, for instance. This call a reaches VRU 13 via the mobile radio telephone network (not shown). Unit 13 invites subscriber A by means of a recorded message to select a service.

After service selection, again by means of subscriber A's control panel keys, VRU 13 signals SSC 10 that subscriber A has selected service SVL 1, for example. Here VRU 13 may either determine the calling subscriber's telephone number automatically (Calling Number Identification) or inquire it of the calling subscriber via a voice output. This information flow is indicated in the drawing by a, b.

SSC 10 now checks with the aid of database 14 whether the customer is known and authorized for service SVL 1. If not, the inquiry is refused by an appropriate announcement from VRU 13, for instance. If the customer is known and authorized, the first message for the desired service SVL 1 is formed; and by calling up the Authentification Center 14, a security code, the cryptogram, is formed. Such a cryptogram or a word encoded according to certain rules may, for instance, be formed according to the known DES standard.

This satisfies the equation $$SRES = A3\ (ki, RAND)$$

wherein:

SRES stands for Signed Responds, i.e., message response,

A3 is a secret algorithm stored both in Authentification Center 15 and on chip card 22, ki is a secret code which is likewise present both in Authentification Center 15 and on the card 22 of the respective subscriber, and RAND stands for random number or checksum, which according to the present invention is obtained, for instance, from the contents of the first message as follows:

RAND=f(message).

The function by which the random number or checksum is to be obtained from the message may be established by the subscriber himself, for instance, during an identification procedure upon first use of the chip card, which procedure need not be discussed in detail here. It may be any mathematical function which is in some way associated with, e.g., the length of the message. The random number or checksum RAND, or the function by which this number is to be calculated, is stored on chip card 22 and in Authentification Center 15 and is calculated in each instance on the spot.

The cryptogram SRES calculated according to the foregoing equations is filed in block 43 of identification code 40 in the data telegram for the first message. The current synchronization counter for subscriber A's chip card 22 is determined via database 14. The contents of the synchronization counter are also part of the identification code and are filed in block 42. Inputted into block 41 of the identification code is how many partial messages are comprised by the message called for and to be transmitted to subscriber A and which part within a sequence of parts is in the process of being edited. These operations are indicated by the letter c in FIG. 8.

SSC 10 now sends the message edited in this way, which may consist of one or more parts or data telegrams, to subscriber A, i.e., to his chip card 22 inserted in a terminal 4. As stated earlier, all such messages are sent off as GSM Class 2 messages. The dispatch of such a message is indicated by the letter d. As soon as a message which has passed the test criteria of the filter on subscriber A's chip card is stored thereon, the chip card generates and sends back to SSC 10 an affirmative response, designated as e.

According to the GSM standard, all messages are both sent and received via an SMS-C 8.

The inventive filter 12.1 contained in a memory area on subscriber A's chip card 22 recognizes the incoming messages, collects partial messages in chip-card stack 28, and runs the card application when all the parts have arrived. This can be determined with the aid of block 41 from identification code 40.

As a result of the messages received, the card can, for example, generate new, outgoing messages and send them as SMS MO/PP short messages (see initial description of FIG. 1) to SMS-C 8, which relays the messages to SSC 10 based on the identification code. Such a message is indicated by the letter f in FIG. 8.

A cycle d, e, f may be repeated as many times as desired according to the special service wanted and according to the selected logic module 11.1 to 11.n. SSC 10 then increases with each message the synchronization counter per card and forms for each message a corresponding cryptogram, so that subscriber A's chip card can check the authenticity of the data. The responses from subscriber A's chip card to SSC 10 are preferably also encoded according to the above-mentioned equations.

The order of blocks 41, 42, 43 is not essential to the invention and may be any desired order.

What is claimed is:

1. In a system for transmitting messages in a communication network for voice and data processing of the type having a plurality of terminals, each allocated to a specific user or capable of being allocated to a specific user by means of a data carrier insertable therein, at least two of said terminals being capable of entering into voice or data communication with one another, and having at least one center for controlling message transmission within said communication network, each message transmission being a data communication including an exchange of standard data telegrams containing a standardized data header, an improvement comprising:

an identification code appended to said standardized header in one or more of said standard data telegrams without otherwise modifying said standardized header such that existing equipment lacking means for recognizing the identification code operates in accordance with the header without regard for the appended code, while equipment that includes means for recognizing the identification code looks for an appended code in addition to said standardized data header, the addition of the identification code to the standard data telegram creating what are known as special data telegrams, at least one central unit within said communication network, means included in said at least one central unit and in at least some of said terminals for generating said special data telegrams for transmission either from said central unit to at least one of said terminals or from one of said terminals to said central unit, and a plurality of functionally corresponding filters for recognizing standard data telegrams and special data telegrams, one of said filters being respectively associated with said central unit and one with each of said at least some of said terminals, said filters being provided for informing said central unit or said terminal that special data telegrams are to be processed according to a special, not otherwise accessible procedure, and that standard data telegrams are to be processed according to a standard procedure, enabling an application protocol between said terminals and said central unit.

2. The system of claim 1, wherein the communication network is a digitally operating communication network according to the GSM standard.

3. The system of claim 1, wherein the communication network is a digitally operating communication network according to the DCS 1800 standard.

4. The system of claim 1, wherein each of said terminals and each said data carrier comprise storage means, each of said filters associated with said terminals being a software module contained in a said storage means.

5. The system of claim 1, wherein said data carrier is a chip card and at least some of said terminals are mobile radio telephones, each of said mobile radio telephones comprising means for exchanging data with said chip card.

6. The system of claim 1, wherein said special data telegrams are parts of a said message, each message comprising a plurality of said special data telegrams, said identification code in each of said special data telegrams indicating the total number of said special data telegrams in said message and specifying the position of each said special data telegram within said message.

7. The system of claim 6, wherein each of said terminals and each said data carrier comprise storage means, further comprising checking means for causing each of said special data telegrams forming a said message to be stored in a said storage means and for deferring further processing of said special data telegrams until the complete said message is stored in said storage means.

8. The system of claim 1, wherein said identification code follows said standardized data header.

9. The system of claim 1, wherein said identification code comprises a security code, further comprising modules for managing authorization data of individual subscribers authorized to transmit messages containing said identification code and for calculating, encoding, and checking said security code, said modules being associated with said central unit.

10. The system of claim 9, wherein said security code includes the value of a random number, said random number being a function of said message.

11. The system of claim 1, wherein said special data telegrams are components of special services offered by the provider of said communication network.

12. The system of claim 1, wherein said special data telegrams contain message information in encoded form.

13. The system of claim 1, further comprising a plurality of logic modules, each logic module associated with a unique identification code and a unique special service to be performed.

14. The system of claim 1, wherein at least some of said special data telegrams contain executable instructions.

15. The system of claim 1, wherein said standard data telegrams include data telegrams for transmitting short messages by the standardized SMS, and defined according to the GSM standard.

16. In a system for transmitting messages in a communication network for voice and data processing having a plurality of terminals, each allocated to a specific user or capable of being allocated to a specific user by means of a data carrier insertable therein, at least two of said terminals being capable of entering into voice or data communication with one another, having at least one center for controlling message transmission within said communication network, each message transmission being a data communication including an exchange of standard data telegrams containing a standardized data header having an internationally standardized identification code for establishing the identity of the subscriber and the authenticity of the message, and having at least one central unit in said communication network, at least some of said terminals and said central unit having means for generating said data header of said standard data telegrams, said standard data telegrams being transmitted either from said central unit to at least one of said terminals or from one of said terminals to said central unit, said central unit and said at least some of said terminals including facilities for checking said data header, an improvement comprising:

a further identification code; definable by the provider of said communication network, appended to said standardized header in one or more of said standard data telegrams without otherwise modifying said standardized header such that existing equipment lacking means for recognizing the identification code operates in accordance with the header without regard for the appended code, while equipment that includes means for recognizing the identification code looks for an appended code in addition to said standardized header, the addition of the identification code to the standard data telegram creating what are known as special data telegrams, means included in said at least one central unit and in said at least some of said terminals for generating said further identification code, and a plurality of functionally corresponding filters for recognizing standard data telegrams and special data telegrams having said further identification code, and causing messages associated with said special data telegrams to be processed according to a special, not otherwise accessible procedure, and for causing messages associated with said standard data telegrams to be processed according to a standard procedure, enabling an application protocol between said terminals and said central unit, said further identification code comprising a security facility defined by said provider so as to identify special messages, said further identification code being contained in said special data telegrams immediately following said standardized data header.

17. The system of claim 16, wherein the communication network is a digitally operating communication network according to the GSM standard.

18. The system of claim 16, wherein the communication network is a digitally operating communication network according to the DCS 1800 standard.

19. The system of claim 16, wherein each of said terminals and each said data carrier comprise storage means, each of said filters associated with said terminals being a software module contained in a said storage means.

20. The system of claim 16, wherein said data carrier is a chip card and at least some of said terminals are mobile radio telephones, each of said mobile radio telephones comprising means for exchanging data with said chip card.

21. The system of claim 16, wherein said special data telegrams are parts of a said message, each message comprising a plurality of said special data telegrams, said identification code in each of said special data telegrams indicating the total number of said special data telegrams in said message and specifying the position of each said special data telegram within said message.

22. The system of claim 21, wherein each of said terminals and each said data carrier comprise storage means, further comprising checking means for causing each of said special data telegrams forming a said message to be stored in a said storage means and for deferring further processing of said special data telegrams until the complete said message is stored in said storage means.

23. The system of claim 16, wherein said identification code comprises a security code, further comprising modules for managing authorization data of individual subscribers authorized to transmit messages containing said identification code and for calculating, encoding, and checking said security code, said modules being associated with said central unit.

24. The system of claim 13, wherein said security code includes the value of a random number, said random number being a function of said message.

25. The system of claim 16, wherein said special data telegrams are components of special services offered by said provider of said communication network.

26. The system of claim 16, wherein said special data telegrams contain message information in encoded form.

27. The system of claim 16, further comprising a plurality of logic modules, each logic module associated with a unique identification code and a unique special service to be performed.

28. The system of claim 16, wherein at least some of said special data telegrams contain executable instructions.

29. The system of claim 16, wherein said standard data telegrams include data telegrams for transmitting short messages by the standardized SMS, and defined according to the GSM standard.

* * * * *